Sept. 13, 1932. T. V. BUCKWALTER 1,877,740
TRUCK SIDE FRAME
Filed Oct. 2, 1930 2 Sheets-Sheet 1
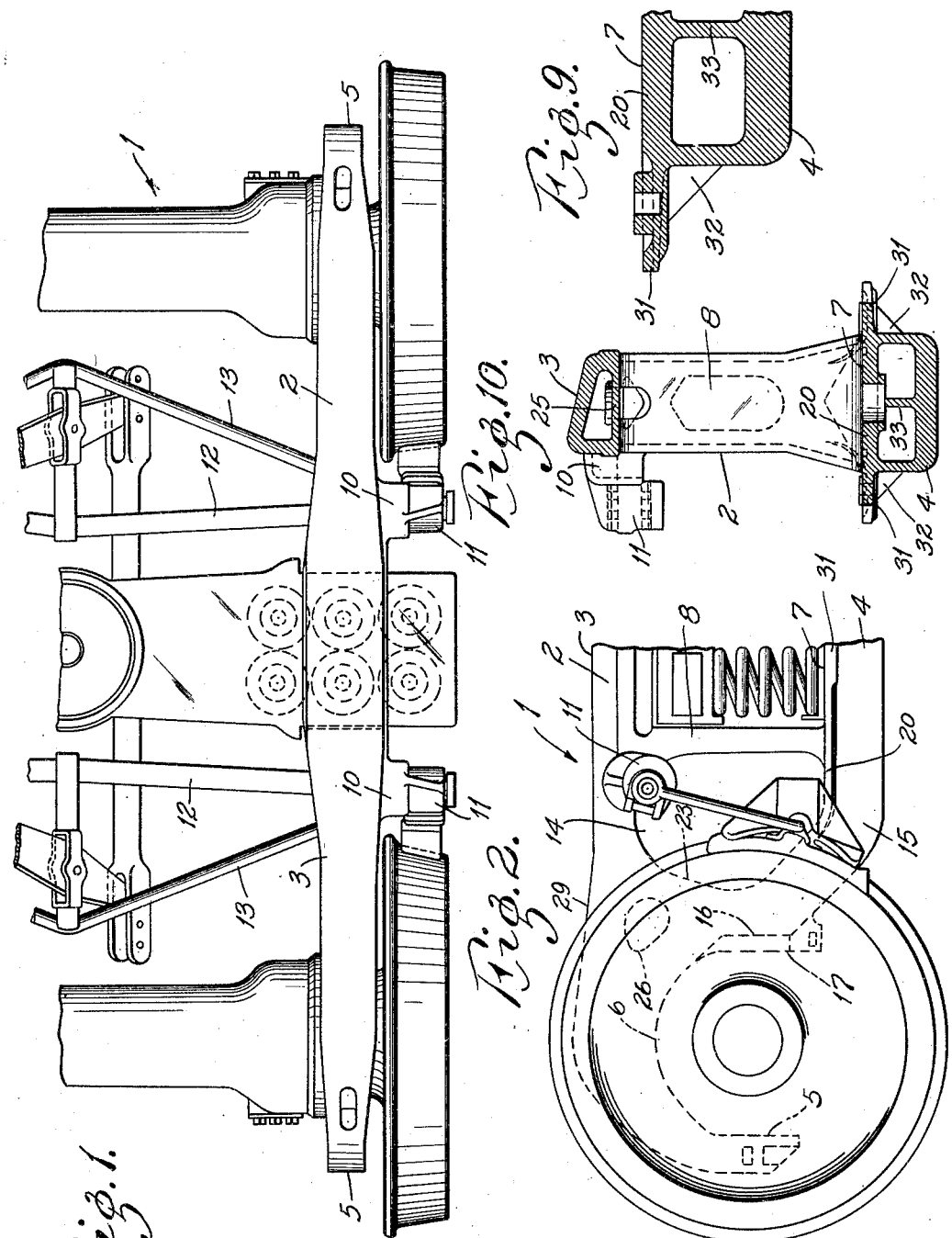
INVENTOR
Tracy V. Buckwalter,
by Carr & Ran & Gravely.
HIS ATTORNEYS.

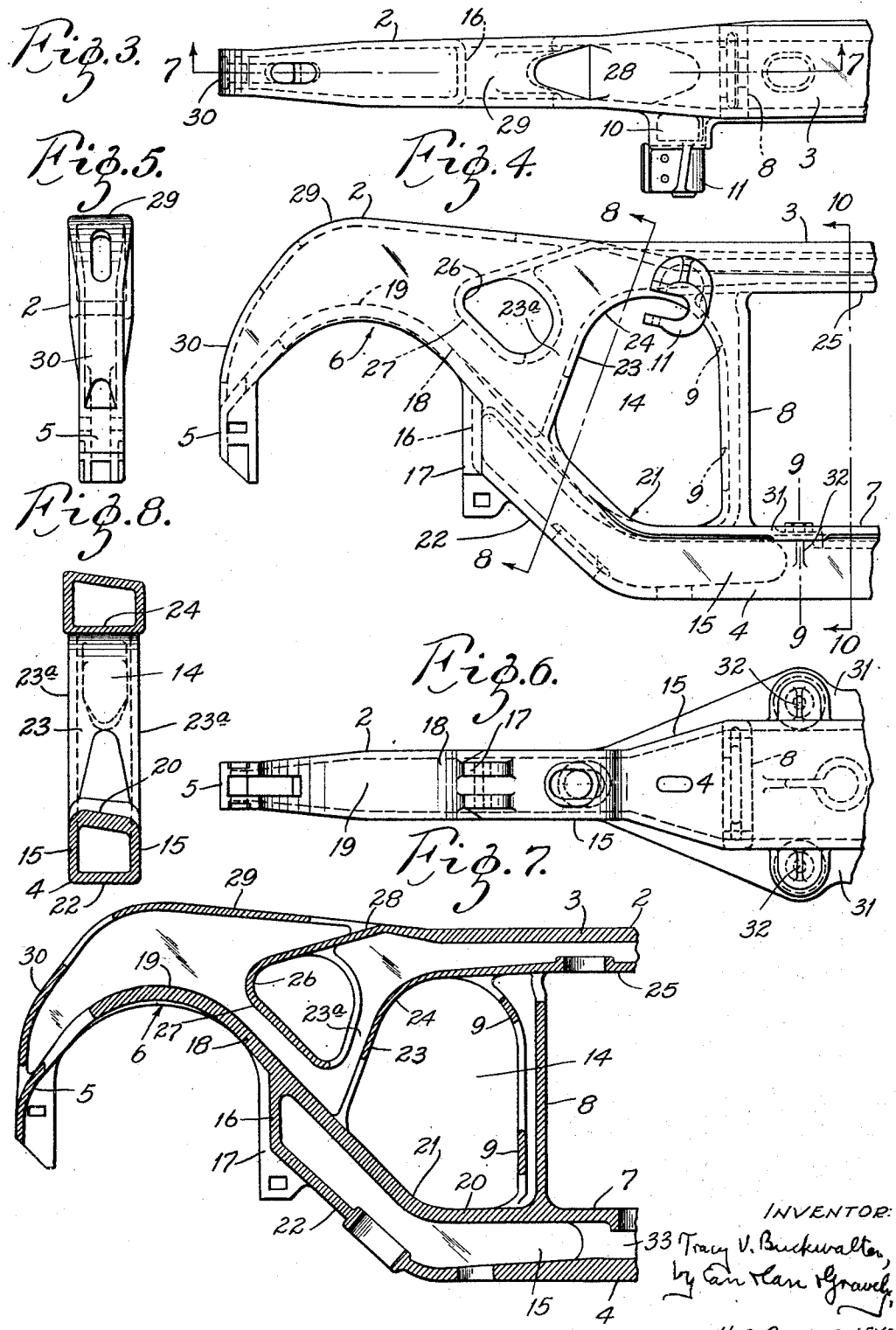

Patented Sept. 13, 1932

1,877,740

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

TRUCK SIDE FRAME

Application filed October 2, 1930. Serial No. 485,850.

My invention relates to truck side frames for railway cars and the like, particularly to side frames for car trucks of the inboard type wherein the truck side frames are located inside the lines of the wheels. In car trucks of this type, it is desirable for numerous reasons to extend the brake beams through the side frames, and necessarily in order to provide for proper accomodation and manipulation of the brakes, the brake beam openings must be of considerable size and due to this fact it has been impractical and uneconomical to use this type of side frame for heavy duty.

The principal object of this invention is to devise an economical truck side frame that will adapt the inboard car truck for heavy duty.

My invention consists in the truck side frame and in the parts, combinations and arrangements of parts hereinafter described and claimed.

In the accompanying drawings, which form part of this specification and wherein like reference numerals refer to like parts wherever they occur, Fig. 1 is a plan view of one-half of a car truck equipped with a side frame embodying my invention, Fig. 2 is a side elevation of one-half of Fig. 1, Fig. 3 is a detail top view of one-half of a truck side frame, Fig. 4 is a side view of Fig. 3, Fig. 5 is an end view of Fig. 3, Fig. 6 is a bottom view of Fig. 3.

Fig. 7 is a sectional view along the line 7—7 of Fig. 3,

Fig. 8 is a sectional view along the line 8—8 of Fig. 4,

Fig. 9 is a sectional view along the line 9—9 of Fig. 4; and

Fig. 10 is a sectional view along the line 10—10 of Fig. 4.

In the construction illustrated, a car truck 1 of the inboard type is provided with truck side frames 2, which are mounted between the lines of the wheels instead of on the outside thereof as in the case of an ordinary outboard car truck. Each truck side frame 2, which is preferably of integral construction, comprises an upper longitudinal member 3 sloping slightly upwards at each end and a lower longitudinal member 4 that are joined together near the end of said truck to form an outer pedestal leg 5 defining a jaw opening 6. Extending between the upper and lower longitudinal members, on either side of a spring seat 7 in the center of the frame, are vertical column members 8 of channel-shaped cross section preferably provided near the top and bottom with short integral webs 9 closing the open end of the channel. Projecting outwardly from the upper longitudinal member 3 near the top of each vertical upright member 8 are bosses 10 to each of which is pivotally secured a brake hanger 11 to whose lower end is secured a brake beam 12 of any suitable construction, the brake beams being shown provided with a truss rod 13. The end portions of the brake beams extend through openings 14 in the side frame between the vertical members and the end portions of said truck side frame.

In order to permit the necessary movement of the brake beams required in applying and releasing the brakes, the openings in the side frame through which the brake beams extend must necessarily be of considerable size and of such a shape, that in the common type of inboard car truck, in order to provide for suitable openings, economical design has limited their carrying capacity to that of moderate loads only. With my truck side frame, however, the openings 14 which are provided in the side frames are large enough for proper manipulation and accommodation of the brake beams, and yet a side frame embodying my invention, is adapted for carrying loads as high as ninety tons or more.

The lower longitudinal member 4 of my truck side frame is of hollow-rectangular cross section and the side flange portions 15 of the central horizontal portion of said member slope upwards near each end and then extend in an almost vertical direction, the outer edges of said flanges along the vertical part being provided with a short vertical web 16 forming a base for an inner pedestal leg 17. Said flange portions 15 after extending along and forming the inner pedestal leg curve around the top of the jaw opening 6 and ultimately merge into the top longitudinal compression member to form the outer pedestal leg 5.

Extending between said flanged portions 15 and integral therewith, is a web portion 18 which forms the top curved wall 19 of the jaw opening 6 and then extends tangentially therefrom in a straight line ultimately becoming a top web portion 20 of the lower longitudinal member along its horizontal central portion. Said web portion 18 is also twisted diagonally downwards from the outer flange portion to the inner flange portion which provides for further clearance at the bottom wall portion 21 of the brake beam opening 14. The bottom web 22 of the lower longitudinal member after sloping upwards in a direction similar to that of the top web 18 is finally disposed vertically upwards forming the web 16 of the inner pedestal leg which joins the web 18.

It is obvious, that the lower longitudinal member, due to the shape of its end portions provides a large opening, suitable for accommodation of brake beams on each side of the center of said side frame, between the upper and lower longitudinal members, the vertical column member and the end portions of said frame. However, when the side frame is loaded, the lower longitudinal member will be subjected to a pull at each end and hence besides being subjected to a true tensional stress will also be subjected to serious bending stresses due to the jogged shape of the neutral axis of said member. In order to take care of any bending stresses therefore, a hollow brace member 23 comprising side flange portions 23a extends diagonally from the sloping portion of the lower longitudinal member adjacent the inner pedestal leg to the upper longitudinal compression member, and reaches said member slightly outside the brake beam boss at that end. The member 22 is provided with an inner web 24 extending from slightly below the mid part of said member 22, and which curves near the top toward the horizontal central portion of the upper longitudinal member and constitutes the top wall of the brake beam opening 14 and ultimately forms the bottom web 25 of the upper longitudinal member.

A small opening 26 near the end of the side frame formed between the diagonal member 22 and the top and bottom longitudinal members is defined on its outer side with another web 27 which extends parallel with the web 18 from the base of the diagonal member 22 and then curves in a reverse direction finally constituting a top web 28 of the upper longitudinal member. The upper longitudinal member which slopes slightly upwards near each end is also provided with a top web 29 above the jaw opening and also another short web 30 at the outer end of said side frame above the outer pedestal leg to insure proper rigidity at the end of said side frame.

As the bending stresses in a side frame are greatest at the center, my side frame is widest at the center between the upright column members and tapers from each vertical column member to a narrower width near the inner pedestal leg and again from about the center of the jaw opening to each end. This provides suitable clearance between the inside of the wheels and the side frame, and also provides a more economical design.

Preferably, in order to provide a suitable bearing area at the spring seat 7, the lower longitudinal member is flanged outwardly at its top and said flanges 31 are braced by means of small ribs 32 in the form of brackets. A small central web 33 also helps to support the spring seat and offers a larger sectional area for diminishing stresses in the lower longitudinal member.

It has been found by experiment that truck side frames of the inboard type which are provided with brake beam openings usually fracture when overstrained along the longitudinal tension member near its end just below the brake beam openings. In my truck side frame, by providing said member with a novel web arrangement and inserting the diagonal brace member to distribute a portion of the stresses to the upper longitudinal member, all of the stresses encountered are taken care of, and it has been found that a truck side frame embodying my invention will pass the standard A. R. A. requirements when tested for a ninety ton load, whereas an inboard truck side frame provided with large brake beam openings and constructed in the ordinary manner to carry a ninety ton load will fail under similar tests.

As truck side frames of this type are statically indeterminate, it is no matter of simple design to obtain an economical side frame for heavy duty, and as the novel construction of my side frame adapts the inboard car truck for heavy duty the advantages of my truck side frame are obvious.

What I claim is:

1. A truck side frame comprising a pair of jaws at each end, an upper longitudinal member, a lower longitudinal member which is inclined upwards for a slight distance near each end, then extends upwardly in a more nearly vertical direction and then is inclined in a reverse direction merging into the upper longitudinal member, and a diagonal brace member extending from the lower longitudinal member at a point near the top of the inner jaw to the upper longitudinal member.

2. A truck side frame comprising a pair of jaws at each end, an upper longitudinal member, a lower longitudinal member, vertical column members located on each side of the center of said frame extending between the upper and lower longitudinal members, said lower longitudinal member sloping upwards from a point slightly outside each vertical column member to a point in close proximity to the base of the inner jaw, then extending upwards in a more nearly vertical direction and finally in a reverse direction and merging with the upper longitudinal member to form the outer jaw, and a diagonal brace member extending from the lower longitudinal member near the top of the inner jaw to the upper longitudinal member.

3. A truck side frame comprising an upper longitudinal member and a lower longitudinal member which is inclined upwardly at each end to join the upper longitudinal member, and a web provided along the top portion of the lower longitudinal member, whose ends ultimately form the top curved wall of a jaw opening.

4. A truck side frame comprising an upper longitudinal member and a lower longitudinal member comprising spaced side flanges which slope upwardly at each end around a brake beam opening and then merge with the upper longitudinal member ultimately forming an outer jaw defining a jaw opening, and a top web extending between said flanges along the central horizontal portion thereof which extends upwardly at each end and finally describes an arcuate curve constituting the top wall of the jaw opening.

5. A truck side frame provided with brake beam openings in each end, each of said openings being defined at the top and bottom of an upper longitudinal member and a lower longitudinal member respectively, on one side by a vertical column member extending between the upper and lower longitudinal members, and on the other side by a sloping portion of the lower longitudinal member which curves into a substantially vertical portion, and also by a short diagonal brace member extending from the top of the vertical portion of the lower longitudinal member to the upper longitudinal member.

6. A truck side frame provided with brake beam openings near each end, each of said openings being defined at the top by an upper longitudinal member, on the side nearest the center of said side frame by a vertical column member, on the bottom by a horizontal lower longitudinal member which slopes upwards near the end and then extends almost vertically upwards to define a portion of the endmost side of said opening, the remaining endmost side portion being defined by a diagonal brace member extending from the top of the vertical portion of the lower longitudinal member to the upper longitudinal member.

7. A truck side frame having a brake beam opening near each end which is bordered on one side by a vertical column member and on the bottom and partly on the other side by a lower longitudinal member having vertical flange portions which slope upwardly and then are substantially vertically disposed along the side of said opening finally merging with side flange portions of a diagonal brace member which extends to a top longitudinal member to define the remaining side and top portion of said opening, and a web which extends tangentially from the top of a jaw opening to ultimately form the top web portion of the lower longitudinal member along a central horizontal portion.

8. A side frame comprising a top member, a bottom member, columns connecting said members, the bottom member being straight between the columns and curving upwardly beyond the columns, and upwardly converging inclined hanger elements connecting said top and bottom members and spaced outwardly from the columns whereby to define an opening through which a brake beam may be passed.

9. A side frame comprising a top member, a bottom member straight columns connecting said members and defining therewith a bolster opening of uniform width, and upwardly converging inclined hanger elements connecting the top and bottom members and spaced longitudinally of the frame from the columns.

10. A car truck side frame including a compression member, a tension member, the ends of said members merging into each other and forming arc-shaped ends for the side frame, columns connecting said members, and hanger elements connecting said members and spaced outwardly from the columns, whereby to define pairs of openings, some of said openings permitting the brake beams to be passed therethrough, each of said last mentioned openings being of substantially the same height as the opening between the columns, and being of only slightly less width than the opening between the columns.

11. A car truck side frame as claimed in claim 10, including brake hanger brackets projecting laterally from the side frame, and arranged substantially centrally over the openings defined by the columns and hanger elements.

12. A side frame for car trucks, comprising a top member, a bottom member and vertical members connecting the top and bottom members, the bottom member having its end portions extending in opposite directions and merging into the ends of the top member, said side frame having a bolster opening between the vertical members, and brake beam openings at opposite sides of the vertical members, each of said openings being substantially equal in area to each of the other openings, upwardly converging hanger elements connecting the top and bottom members and defining the outer walls of the brake beam openings, and webs extending from the hanger elements to the ends of the side frame.

Signed at Canton, Ohio, this 24th day of Sept. 1930.

TRACY V. BUCKWALTER.